** 3,549,558
CRYSTALLINE ALUMINO-SILICATE CATALYST**
Thomas E. Berry, Pinole, and Hans A. Benesi, Berkeley, Calif., assignors to Shell Oil Company, New York, N.Y., a corporation of Delaware
No Drawing. Filed Aug. 29, 1968, Ser. No. 756,328
Int. Cl. B01j *11/40*
U.S. Cl. 252—455                                                  11 Claims

ABSTRACT OF THE DISCLOSURE

Highly active crystalline alumino-silicate zeolite catalysts are prepared by a special ion exchange/stabilization procedure which comprises: (1) substantially complete removal of sodium ions (to below about 0.5% w.) from a zeolite of the faujasite crystalline form; (2) selective reintroduction of sodium to a level of between about 0.5 to 1%, washing to remove unexchanged sodium ions, followed by; (3) high temperature (ca. 800° C.) calcination, and (4) preferably removal of sodium following calcination by ion exchange and drying and calcining.

BACKGROUND OF THE INVENTION

Field of the invention

This invention relates to a new highly active and stable crystalline alumino-silicate zeolite catalyst.

Description of the prior art

Crystalline alumino-silicate zeolites have in recent years become of major importance as catalysts and catalytic components for hydrocarbon conversion reactions. Both naturally occurring and synthetically prepared zeolites have demonstrated extraordinary catalytic properties.

Synthetic zeolites are favored since the crystal structure and compositional purity can be carefully controlled to achieve the desired properties.

Synthetic zeolites are almost universally prepared in the alkali metal (sodium or potassium) form by crystallizing the zeolite from an aqueous reaction mixture containing alumina (as sodium aluminate, alumina sol, etc.), silica (as sodium silicate, silica gel or silica sol), and alkali metal oxides such as sodium hydroxide. The presence of alkali metal oxide initially helps to stabilize the zeolite structure but, as is well known, the alkali metal must be replaced, at least partially, to achieve appreciable catalytic activity.

Synthetic faujasites as customarily prepared typically contain in the range of about 5–13% w. sodium. Exchange of the sodium for hydrogen ion has long been recognized as a means of markedly improving catalytic activity. However, when sodium is reduced to levels below about 2% w., the crystal structure becomes unstable and is easily collapsed upon heating, resulting in a substantially amorphous silica alumina of much lower catalytic activity. This phenomenon has been ascribed to a difference in the chemical nature of the bound sodium ions in the crystal structure. It has been proposed that the bulk of the sodium occupies positions in the structure which do not fundamentally affect the structural stability, i.e., in "cage" positions while the remaining sodium (ca. 1% k.) occupy "bridge" positions in the crystal and when removed result in structural collapse. (See Broussard et al., U.S. 3,287,255 issued November 1966.)

It has recently been suggested that very highly stable zeolites can be produced by a process which comprises a sequence of ion exchange steps to replace alkali metal ions in the zeolite interposed with a step of heating the zeolite to temperature with the ring of 1300° F. (704° C.) to 1600° F. (871° C.) The intermediate heating or calcination step permits alkali metal removal to previously unobtainable levels, Maher et al., U.S. 3,293,192 issued December 1966. Zeolites having very low alkali metal contents are unstable even to the intermediate calcination step and other special procedures, such as steeping the highly exchanged zeolite in the exchange solution is required, Maher et al., U.S. 3,374,056 issued March 1968.

We have now discovered a method of producing a hydrogen zeolite of the faujasite type having very low alkali metal content which not only preserves and stabilizes the crystal structure but exhibits superior catalytic activity.

SUMMARY OF THE INVENTION

In broad aspect the present invention is a crystalline zeolite having a faujasite crystal structure prepared by a special sequential treatment comprising:

(a) Ion - exchanging substantially all the alkali metal (to below about 0.5% w.) from an alkali metal form of zeolite;

(b) Reintroducing alkali metal into the structure by back ion exchange of alkali ions to a level of between 0.5 to about 1% w. (preferably 0.7 to 0.9% w.);

(c) Washing the solid to remove unexchanged sodium ions followed by calcination at a temperature controlled within the narrow critical range of from about 775° C. to 810° C.; and, preferably, (d) Again removing alkali metal ions by ion exchange to a level below about 0.2% w.; and (e) Drying and calcining.

Synthetic crystalline zeolites having structures similar to that of the mineral faujasite are preferred starting materials for the catalysts of the present invention. Y-faujasite which has relatively higher silica content and more inherent structural stability than other zeolites of the faujasite type is particularly suitable. Preparation of Y-zeolite and its properties is disclosed in U.S. 3,130,007.

According to the present invention, substantially all the alkali metal ions in the zeolite structure are removed by ion exchange. Suitable for ion exchange are ammonium salts, such as for example, ammonium nitrate, carbonate, sulfate, halides, etc. Ion exchange may be carried out with ammonium ions in solution but it is preferred that metal ion exchange not be used since the replacement of alkali metal ions by other metal ions has undesirable aspects. For example, silver nitrate solution is very efficient for removal of alkali metal ion but introduces silver ions which interfere with the desired structural changes accomplished by the invention. In most cases, multiple exchanges are required. The exchange is carried out by any conventional exchange procedure, either batchwise or continuous and preferably at elevated temperatures in the range öf 100° C., as for example, by refluxing the zeolite in an exchange solution. For example, in batchwise exchange the sodium zeolite is slurried with an appropriate ammonium compound such as 2 M ammonium nitrate, separated from the solution by filtration or settling, then washed with water. This procedure is repeated several times. To accomplish the desired advantage of the invention, the exchanged zeolite should contain less than about 0.5% residual sodium and preferably less than about 0.2% w.

In the second step the exhaustively exchanged zeolite is back exchanged with a sodium salt to reintroduce some alkali metal. The alkali metal level after reintroduction should not exceed about 1% w. basis the dry zeolite and should be in excess of about 0.5% w.—it being preferred that alkali metal be reintroduced to about 0.7–0.9% w.

The removal of substantially all the alkali metal followed by reintroduction to a stabilizing level has a surprising effect upon the catalyst activity. It is known that some alkali metal (usually sodium) must be present during the stabilizing calcination since at very low alkali metal levels—below about 0.5% w.—calcination collapses the crystal structure. However, the catalytic advantages of complete removal and reintroduction of alkali metal are quite unexpected. This phenomenon is believed to result from the nature of the zeolite structure itself. Removal of the initial sodium by ammonium ion exchange at temperatures of about 100° C. does not discriminate between the differently coordinated metal ions in the crystal structure, i.e., between "bridge" and "cage" sodium. Therefore, the absolute level of sodium during the stabilizing calcination step is not the essential requirement but rather the level of the properly coordinated ("cage") alkali metal ions. By complete removal and reintroduction, the introduced ions are selectively taken up in the proper position resulting in a novel composition of stable active hydrogen faujasite.

An alternative and somewhat simpler method of alkali metal removal and reintroduction has also been discovered and forms a preferred method within the scope of the invention. It has been found that exchange of alkali metal zeolite with ammonium ion solution at ambient temperature (25° C.) proceeds rapidly to remove all but about 1.5 to 2.0% w. of the zeolitic alkali metal ions— the level being in most cases about 1.7% w. Upon increasing the exchange temperature to about 100° C. this alkali metal is rapidly substantially removed. Not only does this result form an easy and convenient means of characterizing the differently coordinated metal ions but provides a convenient means for the method of the invention. Based on this discovery, alkali metal can be exhaustively removed from an alkali metal faujasite such as Y-zeolite by exchange with an ammonium ion solution at about 100° C. It is often convenient to simply reflux the solution with the zeolite. After exchange equilibrium is reached through multiple batchwise or continuous exchange, the mixture of zeolite and exchange solution— containing some portion of the removed alkali metal ions—is cooled to about 25° C. where the alkali metal will reequilibrate into the preferred zeolitic positions, thus achieving the desired back-exchange required in the process of the invention.

It is especially important to note that the highly exchanged zeolite having substantially all the alkali metal removed and being unstabilized is highly reactive so that reintroduction of the alkali metal to the 0.5 to 1% level should be accomplished as rapidly as possible to prevent undesirable structural changes (presumably by hydration of the alumina). Thus the highly exchanged zeolite should be further processed as soon as possible. After reintroduction of the alkali metal ions, this precaution is no longer required. The preferred method of hot ammonium ion removal with low temperature reequilibration described above is especially advantageous in this respect since the removal and reintroduction can be rapidly accomplished.

Following reintroduction of alkali metal to the desired level the catalyst is washed to remove any unexchanged ions prior to calcination. Water which is substantially free of metallic ions has proved a very suitable wash medium, quite unexpectedly it was found that washing with nonalkali metal ammonium ion solution gives superior catalytic activity. For example, washing with a 2 M solution of ammonium nitrate solution at about 20° C. was especially suitable. It should be noted that at this temperature little or no further removal of alkali metal ions is accomplished and the treatment can be considered a chemical wash.

Calcination of the zeolite having alkali metal ions selectively placed in the crystal structure is a critical and essential feature of the method of the invention. It is this step which gives the final low alkali metal zeolite its structural stability. The reason for the stabilization of the structure by intermediate calcination is not clearly understood but is believed to be related to a rearrangement of the molecular coordination, at least in part, from a tetrahedral to trigonal bonding of the silicon/aluminum/oxygen system. In any case calcination is required and the temperature must be controlled over a narrow critical range. Calcination below about 775° C. is not effective to accomplish the desired results and temperatures above about 810° C. collapse the crystal structure. Therefore, calcination should be controlled as closely to 800° C. as possible. Atmospheric pressure is suitable for the calcination treatment, pressure not being a variable of critical importance. (The calcination is preferably carried out in a static atmosphere.) The time of calcining after reaching 800° C. is not especially critical, but should be continued for sufficient time to remove water physically associated with the catalyst—one hour should suffice but longer periods can be used. However, the time required to reach the desired calcination temperature level is important. As is known in the art, there is a temperature region from about 200–400° C. where unknown hydrothermal damage to the crystal structure can occur. Thus, it is important to pass through this temperature level as rapidly as practical to minimize the damage. It has been noted that heating times through the undesirable temperature zone of as little as one hour result in damage to the structure with concomitant loss in catalytic performance. It is especially preferred that calcination be carried out for about 1–5 hours in still air at a temperature of about 800° C.

Following calcination the zeolite is preferably ion exchanged a second time to reduce the sodium level to below about 0.2% w. basis dry catalyst. Thus exchange is carried out substantially in the same manner as described for the initial exchange.

Following this exchange if used the catalyst is dryed and calcined again. Drying is similarly carried out at about 120° C. A stepwise drying procedure where the catalyst is heated to about 120° C. to remove most of the water and then heated to about 350° C. is preferred. After drying the catalyst is calcined, but unlike the intermediate calcination, temperature is not as critical. Temperature of the second calcination should be above about 500° C. and not exceed about 900° C. In other respects the final calcination is like the previously described intermediate calcination.

For many catalytic applications the novel zeolitic material of the invention is preferably composited with a hydrogenative metal component such as metals of Group VI–B (Cr, Mo, W) and Group VIII of the Periodic Table of Elements. Noble metals of Group VIII (Pt and Pd) are especially suitable. The hydrogenative metals can be composited with the zeolite by various means known in the art. Palladium, for instance, is conveniently incorporated by impregnation of the zeolite with ammoniacal palladium chloride solution. When noble metals of Group VIII are used, it is preferred that the hydrogenative metal content be about 2% w. or less. Catalyst containing 0.25–1.0% w. palladium on zeolite tested according to the invention provides highly active and efficient hydrocracking catalysts. Hydrogenative metals can be composited with the zeolite before or after the final calcination and preferably before, especially when the metal is incorporated by ion exchange rather than simple metal deposition. Following incorporation of the metals the catalyst is dried and calcined as previously described.

Incorporation of metal after the final calcination of the zeolite would require a duplication of the second drying and calcination steps and is, in all but exceptional circumstances, undesirable.

Catalysts prepared according to the invention are conveniently used in the form of discrete particles, such as granules, extrudates, pellets and the like, usually ranging in size from about 1/16 inch to about 1/4 inch in average diameter. These particles are preferably disposed in a stationary bed within a suitable reactor capable of withstanding high pressure. Of course, smaller catalyst particles may be used in fluidized or slurry reactor systems. The catalyst may also be composited with a refractory oxide, such as by copelleting. This is particularly suitable where the catalysts are to be used in a fixed bed of discrete particles in which hardness and resistance to attrition are desirable. For example, pellets comprising about 25% w. alumina and about 75% w. zeolite having an incorporated hydrogenation metal component, have been found particularly appropriate for isomerization catalysts. However, the concentration of zeolite in relation to the concentration of refractory oxide can vary as desired. Mixtures of refractory oxides, such as silica-alumina can also be used if desired. The catalysts of the invention are very suitable for hydroconversion processes. Catalysts of the invention, especially those having a noble metal incorporated thereon, such as palladium or platinum, are especially active and suitable for paraffin isomerization.

Feed to an isomerization process using catalysts of the invention can be a substantially pure normal paraffin having from 4 through 7 carbon atoms, mixtures of such normal paraffins, or hydrocarbon fractions rich in such normal paraffins. Suitable hydrocarbon fractions are the $C_4$ to $C_7$ straight-run fractions of petroleum.

The process of the invention is conducted at a temperature in the range from about 200° C. to 350° C. and preferably from about 225° C. to 315° C. At lower temperatures, conversion or normal paraffins is generally too low to be practical, although selectivity to isoparaffins is substantially 100%. At higher temperatures, conversion of normal paraffins is quite high; however, excessive cracking is encountered and selectivity to isoparaffin is extremely low as a result.

The isomerization reaction can be conducted over a wide range of space velocities, but in general the space velocity is in the range from about 0.5 to 10 and preferably from about 1 to 5. In general, conversion of normal paraffins decreases with an increase in space velocity, although selectivity to the isoparaffin is increased. Space velocity, as the term is used herein, refers to WHSV and is expressed as weight of feed per hour per unit weight of catalyst.

The isomerization reaction is carried out in the presence of hydrogen; however, there is little or no net consumption of hydrogen in the process. Any consumption of hydrogen is the result of hydrocracking reactions and it is preferred to keep such reactions to a minimum. The function of the hydrogen is primarily to improve catalyst life, apparently by preventing polymerization of intermediate reaction products which would otherwise polymerize and deposit on the catalyst. A hydrogen to oil mole ratio of from about 1:1 to 25:1 and preferably from about 2:1 to 15:1 is used. It is not necessary to employ pure hydrogen since hydrogen-containing gases, e.g., hydrogen-rich gas from the catalytic reforming of naphthas, are suitable. Total pressure is in the range from about atmospheric to 1000 pounds per square inch gauge (p.s.i.g.) and preferably from about 300 to 750 p.s.i.g.

The following examples further illustrate the practice and advantages of the invention and are not to be construed as a limitation thereof.

EXAMPLE I

A sample of sodium Y-zeolite powder (SK–40 from Linde Division, Union Carbide) was refluxed with 2 M $NH_4NO_3$ solutions at 100° C. to reduce its sodium content to about 0.2% w. A total of 10 exchanges was required, each exchange being followed by washing with distilled water. Following the final water wash the material was air dried at room temperature for about 12 hours and divided into several equal portions. These samples were stored for further treatments. One sample (I) was calcined at 800° C. without further treatment. The crystal structure as determined by X-ray diffraction was substantially completely destroyed by the calcination, resulting in an amorphous silica alumina mass.

Another sample (II) after storage for 2 days in the wet form following the final wash described above was back-exchanged with a 0.1 M $NaNO_3$/2.0 M $NH_4NO_3$ solution to increase the sodium level to about 0.7% w., calcined at 800° C. and ion exchanged again with 2.0 M $NH_4NO_3$ to reduce the sodium level to 0.04% w. (basis dry catalyst). This sample retained about 68% of its original crystal structure as determined by X-ray diffraction. The third sample (III) was held in the wet form for 42 days, then treated in exactly the same manner as sample II. Crystallinity of the sample was reduced to 10% of the original. The measurement of crystallinity by X-ray diffraction does not give absolute values but the relative values may be relied upon.

These results clearly illustrate the necessity for alkali metal in excess of 0.2% w. in the zeolite for sustained periods of time in the low sodium form without calcination or sodium reintroduction stabilization.

EXAMPLE II

In a second set of experiments, catalysts were prepared from sodium Y-zeolite pellets (SK–40 from Linde Division, Union Carbide). Samples were exchanged at reflux temperature (100° C.) with 2 M $NH_4NO_3$. After each exchange the catalyst was washed with distilled water. The number of exchanges was varied to obtain various residual sodium levels. Following exchange to the desired sodium level, the catalysts were washed with distilled water, dried at 120° C. and calcined at 800° C. for 3 hours. After calcination the zeolites were again exchanged at 100° C. with 2 M $NH_3NO_3$ to reduce the sodium level to about 0.1% followed by incorporation of palladium by exchange in a $Pd(NH_3)_4$ $Cl/NH_4NO_3$ solution. The resulting catalysts were dried stepwise at 120° C. and 350° C. and calcined at 550° C. The activity of the catalysts were measured for isomerization of n-pentane at 250° C., 1.0 WHSV (weight of liquid/weight of catalyst per hour), 450 p.s.i.g. and 2.5 $H_2$ feed ratio in a laboratory flow reactor. Conversion to isomerized products was taken as the measure of catalyst activity.

Catalyst A was initially exchanged 3 times to reduce the sodium to about 1.5% prior to the 800° C. calcination.

Catalyst B was initially exchanged 5 times to reduce the sodium to about 0.9% w. prior to the 800° C. calcination.

Catalyst C was exchanged 6 times to reduce the sodium to about 0.7 w. prior to calcination.

Catalyst D was exchanged 10 times to reduce the sodium level to about 0.2% and equilibrated with —0.1 M $NaNO_3$/2.0 M $NH_3NO_3$ solution to reintroduce sodium to about 0.7% w. prior to the 800° C. calcination.

Catalyst E was treated the same as Catalyst D with the exception that following the equilibration to reintroduce sodium to about 0.7% w. the catalyst was washed with a 2 M $NH_4NO_3$ solution prior to 800° C. calcination whereas all the other samples were washed with distilled water.

These catalysts are compared in the following Table I.

The marked advantage in catalytic activity for catalysts prepared according to the invention (D and E) is obvious. Extended runs showed the catalyst to have good catalyst life and process stability, i.e., they retained their activity over extended periods without rapid loss of the initial high activity.

TABLE I

| | | Prior to 800° C. calcination | | Finished catalyst | | | |
|---|---|---|---|---|---|---|---|
| | Method | Percent wt., Na | WASH | Percent wt., Na | Percent wt., Pd | Percent crystallinity | Relative activity |
| Catalyst: | | | | | | | |
| A | Direct exchange | 1.5 | H₂O | 0.18 | 0.59 | 54 | 0.65 |
| B | do | 0.9 | H₂O | 0.17 | 0.56 | 4 | 0.97 |
| C | do | 0.7 | H₂O | 0.09 | 0.52 | 47 | 1.0 |
| D | Back exchange | 0.7 | H₂O | 0.10 | 0.47 | 57 | 1.2 |
| E | do | 0.7 | 2 M NH₄NO₃ | 0.09 | 0.49 | 64 | 1.5 |

We claim as our invention:

1. A method of preparing a catalytically active crystalline alumino-silicate having a faujasite crystal structure which comprises:
   (a) ion exchanging substantially all the alkali metal ions from an alkali metal form of crystalline aluminosilicate of the faujasite crystal type;
   (b) reintroducing alkali metal ions into the alumino-silicate by back-exchange to an alkali metal ion level of between 0.5 to about 1.0% by weight; and
   (c) washing to remove unexchanged alkali metal ions followed by calcination at a temperature within the range of from about 775° C. to 810° C.

2. The method of claim 1 wherein the alumino-silicate of step (c) is subsequently ion exchanged with ammonium ions to remove alkali metal ions to below about 0.2% by weight and dryed and calcined.

3. The method of claim 1 wherein the solid following reintroduction of alkali metal in step (b) is washed in step (c) with an aqueous solution of nonalkali metal ions.

4. The method of claim 3 wherein the nonalkali metal ion solution is ammonium nitrate.

5. The method of claim 1 wherein the alkali metal ion removal is effected by exchange at a temperature of about 100° C. and the reintroduction of alkali metal ions in step (b) is effected by lowering the temperature of the exchange solution from about 100° C. to about 25° C.

6. The method of claim 1 wherein alumino-silicate is incorporated with a hydrogenative metal component after subsequent removal of alkali metal ions to below about 0.2% by weight.

7. The method of claim 6 wherein the hydrogenative metal component is a Group VIII metal incorporated by ion exchange after reduction of alkali metal ions to below about 0.2% by weight and prior to final drying and calcining.

8. The method of claim 1 wherein the alkali metal is sodium and the back exchanged alkali metal ion level is between 0.7–0.9% w.

9. A crystalline alumino-silicate composition having a faujasite crystal structure and containing less than about 0.2% w. alkali metal prepared according to the method of claim 1.

10. The composition of claim 9 wherein the alkali metal is sodium and the back exchanged alkali metal ion level is between 0.7–0.9% w.

11. A crystalline alumino-silicate composition having a faujasite structure and containing less than about 0.2% w. sodium prepared according to the method of claim 5.

References Cited

UNITED STATES PATENTS

| 3,130,006 | 4/1964 | Rabo et al. | 23—112X |
| 3,287,255 | 11/1966 | Broussard et al. | 208—111 |
| 3,287,282 | 11/1966 | Stiles | 252—455 |
| 3,364,135 | 1/1968 | Hansford | 252—455X |

DANIEL E. WYMAN, Primary Examiner

C. F. DEES, Assistant Examiner

U.S. Cl. X.R.

23—112; 252—459